(12) United States Patent
Davis et al.

(10) Patent No.: US 11,914,402 B2
(45) Date of Patent: Feb. 27, 2024

(54) DYNAMIC POWER CURVE THROTTLING

(71) Applicant: Cattron North America, Inc., Warren, OH (US)

(72) Inventors: Brett Allen Davis, Roswell, GA (US); James Leighton Staggs, Stone Mountain, GA (US); John Edward Geertsema, Jr., Roswell, GA (US)

(73) Assignee: Cattron North America, Inc., Warren, OH (US)

( * ) Notice: Subject to any disclaimer, the term of this patent is extended or adjusted under 35 U.S.C. 154(b) by 371 days.

(21) Appl. No.: 17/502,874

(22) Filed: Oct. 15, 2021

(65) Prior Publication Data
US 2022/0357755 A1     Nov. 10, 2022

Related U.S. Application Data

(60) Provisional application No. 63/187,891, filed on May 12, 2021, provisional application No. 63/186,347, filed on May 10, 2021, provisional application No. 63/185,719, filed on May 7, 2021.

(51) Int. Cl.
    *G05D 17/00*     (2006.01)
(52) U.S. Cl.
    CPC ................... *G05D 17/00* (2013.01)
(58) Field of Classification Search
    CPC ............ G05D 17/00; F02D 41/2422; F02D 2200/0404; F02D 2200/101; F02D 2200/1012; F02D 11/105
See application file for complete search history.

(56) References Cited

U.S. PATENT DOCUMENTS

| | | | |
|---|---|---|---|
| 6,339,741 B1 | 1/2002 | Ritter et al. | |
| 2005/0121005 A1 | 6/2005 | Edwards | |
| 2005/0246075 A1* | 11/2005 | Foster | B61L 27/57 |
| | | | 701/19 |

(Continued)

FOREIGN PATENT DOCUMENTS

| | | |
|---|---|---|
| EP | 0206271 A1 | 12/1986 |
| WO | WO-2009/002002 A1 | 12/2008 |

OTHER PUBLICATIONS

CANplusTM CP800 Control Panel Operation Manual; 9M02-1000-A201-EN; Jan. 2020; 43 pages.

(Continued)

*Primary Examiner* — Phutthiwat Wongwian
*Assistant Examiner* — Sherman D Manley
(74) *Attorney, Agent, or Firm* — HARNESS, DICKEY & PIERCE, P.L.C.; Anthony G. Fussner

(57) ABSTRACT

The present disclosure generally relates to dynamic power curve throttling. In an exemplary embodiment, a computer-implemented method for enabling dynamic throttling of an engine includes graphically displaying a graph of a linear throttle line for the engine including an idle speed in revolutions per minute (RPM) and one or more operating speeds in revolutions per minute; using a graphical user interface to alter the linear throttling line into a non-linear dynamic throttling line; and generating a table based on the non-linear dynamic throttling line, the table including dynamic throttle increments that vary based on RPM and that are usable by a controller for dynamic throttling of the engine.

21 Claims, 6 Drawing Sheets

(56) References Cited

U.S. PATENT DOCUMENTS

| | | | |
|---|---|---|---|
| 2014/0163792 A1* | 6/2014 | Kim | G05D 17/00 |
| | | | 701/99 |
| 2019/0367045 A1 | 12/2019 | Larson et al. | |
| 2020/0174780 A1* | 6/2020 | Gintz | G06F 8/66 |
| 2020/0193739 A1* | 6/2020 | Gintz | G07C 5/008 |

OTHER PUBLICATIONS

International Search Report and Written Opinion for PCT/US2022/028106 dated Aug. 23, 2021, 9 pages.

\* cited by examiner

| RPM Range | Normal | Dynamic |
|---|---|---|
| 900 | 10 | 50 |
| 1000 | 10 | 50 |
| 1100 | 10 | 50 |
| 1200 | 10 | 50 |
| 1300 | 10 | 35 |
| 1400 | 10 | 25 |
| 1500 | 10 | 10 |
| 1600 | 10 | 10 |
| 1700 | 10 | 5 |
| 1800 | 10 | 5 |
| 1900 | 10 | 5 |
| 2000 | 10 | 5 |
| 2100 | 10 | 5 |
| 2200 | 10 | 10 |
| 2300 | 10 | 10 |
| 2400 | 10 | 10 |
| 2500 | 10 | 35 |
| 2600 | 10 | 35 |
| 2700 | 10 | 50 |
| 2800 | 10 | 50 |
| 2900 | 10 | 50 |
| 3000 | 10 | 50 |

FIG. 5

DYNAMIC POWER CURVE THROTTLING

CROSS-REFERENCE TO RELATED APPLICATIONS

This application claims priority to and the benefit of U.S. Provisional Patent Application No. 63/185,719 filed May 7, 2021, U.S. Provisional Patent Application No. 63/186,347 filed May 10, 2021, and U.S. Provisional Patent Application No. 63/187,891 filed May 12, 2021. The entire disclosures of the above provisional patent applications are incorporated herein by reference.

FIELD

The present disclosure generally relates to dynamic power curve throttling for engine and machines, such as industrial pumps, generators, woodchippers, etc.

BACKGROUND

This section provides background information related to the present disclosure which is not necessarily prior art.

Engines and machines have RPM ideal ranges or "sweet spots". Conventionally, throttle adjustments are a set incremental RPM value, such as 25 RPM (revolutions per minute). A user may manually change the incremental RPM value to a smaller value. But with the smaller incremental RPM value, more throttle adjustments (e.g., throttle presses or rotations) will then be required to incrementally change the throttle in order to reach RPM ideal range or sweet spot of the engine or machine.

DRAWINGS

The drawings described herein are for illustrative purposes only of selected embodiments and not all possible implementations, and are not intended to limit the scope of the present disclosure.

FIGS. 4A, 4B, 4C, and 4D include example line graphs that may be used when setting up dynamic throttling according to exemplary embodiments of the present disclosure.

Figure 4B:
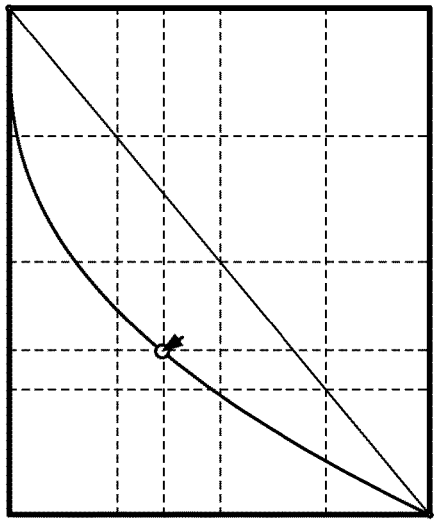
Figure 4D:
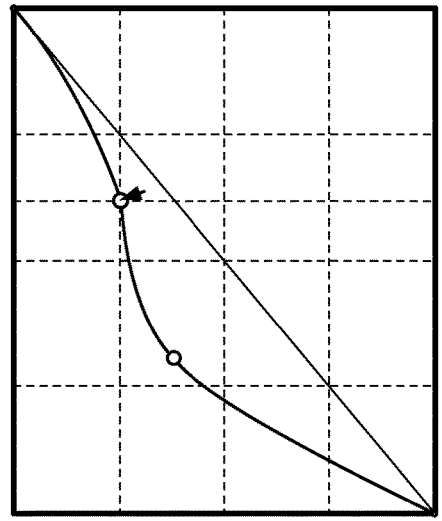

FIG. 5 includes an example table that may be generated from the throttling line shown in FIG. 4D according to exemplary embodiments of the present disclosure.

Figure 6:
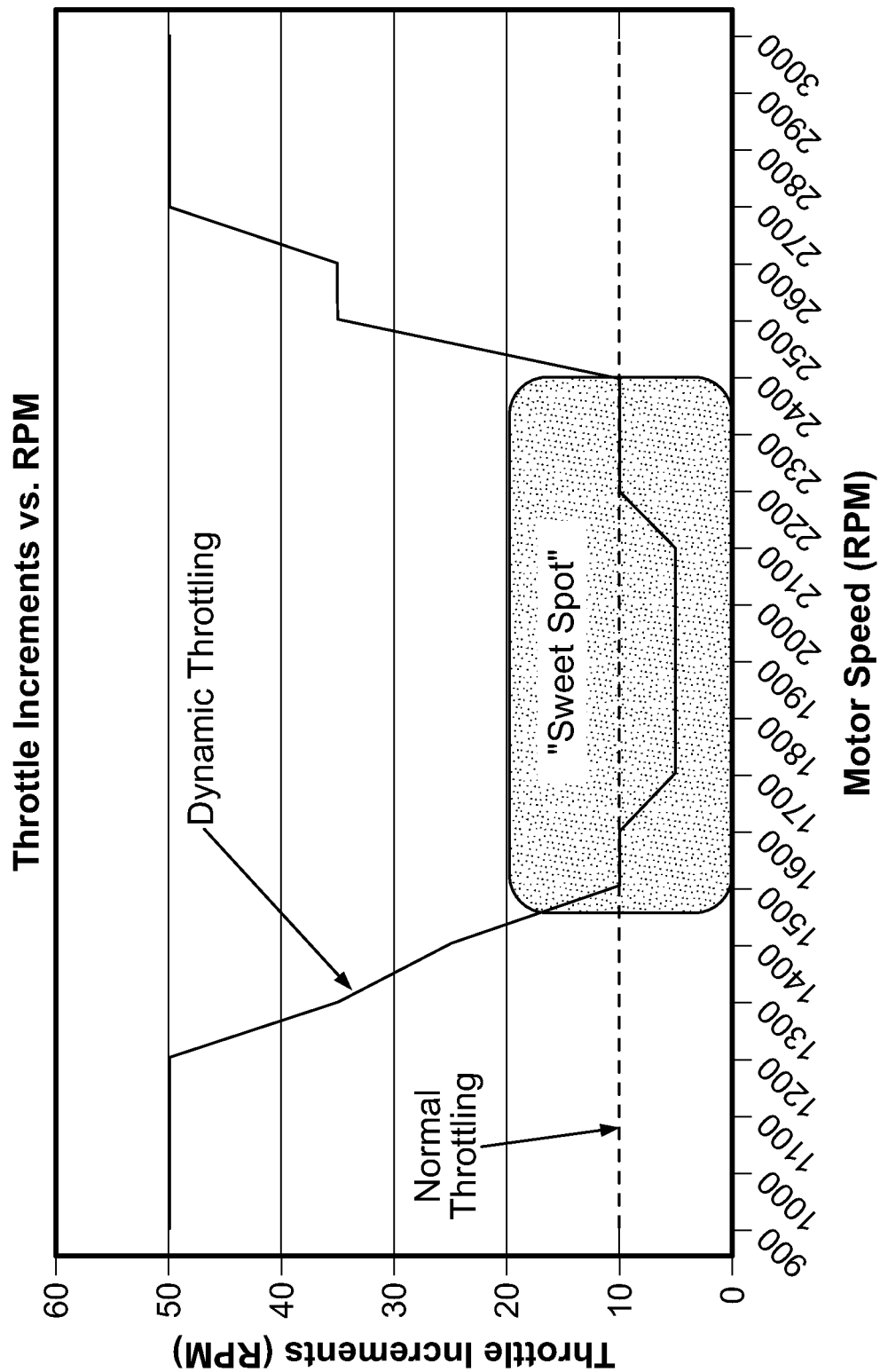

FIG. 6 is a line graph of the dynamic and normal throttle increments (RPM) versus motor speed (RPM) shown in the table of FIG. 5.

DETAILED DESCRIPTION

Example embodiments will now be described more fully with reference to the accompanying drawings.

Figure 1:
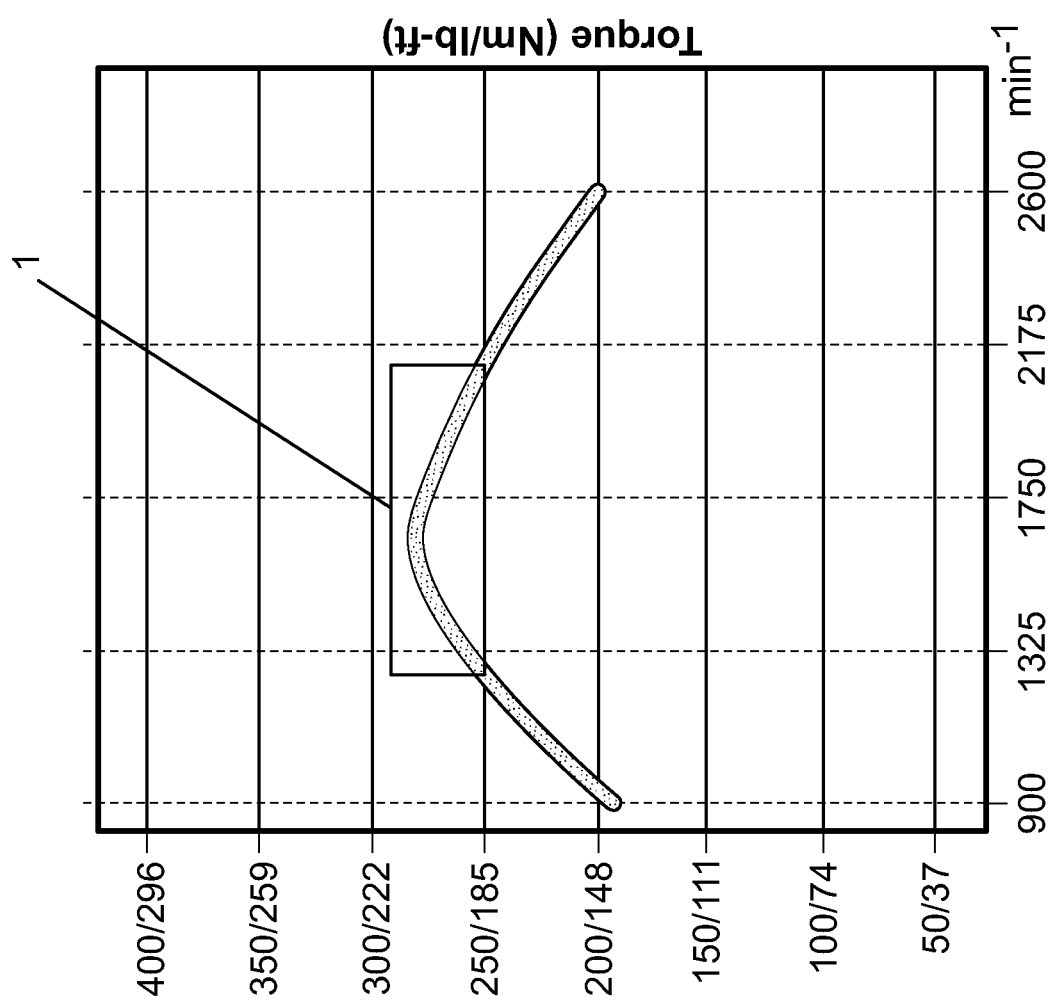
FIG. 1 is a line graph showing a typical torque curve for a diesel engine.

FIG. 1 is a line graph of torque in Newton-meters (Nm) and pound-foot (lb-ft) versus motor speed (RPM) showing a typical torque curve for a diesel engine. The "sweet spot" in the diesel engine's RPM range is indicated by the rectangle 1. This sweet spot is where most applications would want to run.

Conventionally, throttle adjustments are a set incremental RPM value, such as 25 RPM. A user may manually change the incremental RPM value to a smaller value, e.g., using a user interface of a control panel (broadly, a control or controller), etc. But with the smaller incremental RPM value, more throttle adjustments (e.g., throttle presses or rotations) will then be required to incrementally change the throttle in order to reach RPM ideal range or sweet spot of the engine or machine.

After recognizing the above, exemplary embodiments of systems and methods were developed and/or are disclosed herein that include dynamic power curve throttling for engines and machines. In a manually throttled operation, the dynamic throttling as disclosed herein would advantageously enable a user to quickly reach the RPM ideal range or sweet spot of the engine/machine, and thereafter provide a very high throttling resolution (e.g., a highest throttling resolution, etc.) in regard to throttle increments after the engine/machine is within the RPM ideal range/sweet spot.

For example, an engine/machine may vibrate considerably within an RPM range from just above idle to just above 1000 RPM. In this example, the dynamic throttling disclosed herein allows a user to adjust the throttle of the engine/machine to avoid this considerable vibration issue by quickly passing through this RPM range and thereafter quickly reaching the RPM sweet spot of the engine/machine.

Exemplary embodiments disclosed herein are configured such that throttle increments vary based on the RPM and allows quick movement from idle to the sweet spot. While in the sweet spot, the throttle increments decrease to allow high throttling resolution while in the sweet spot.

Figure 2:
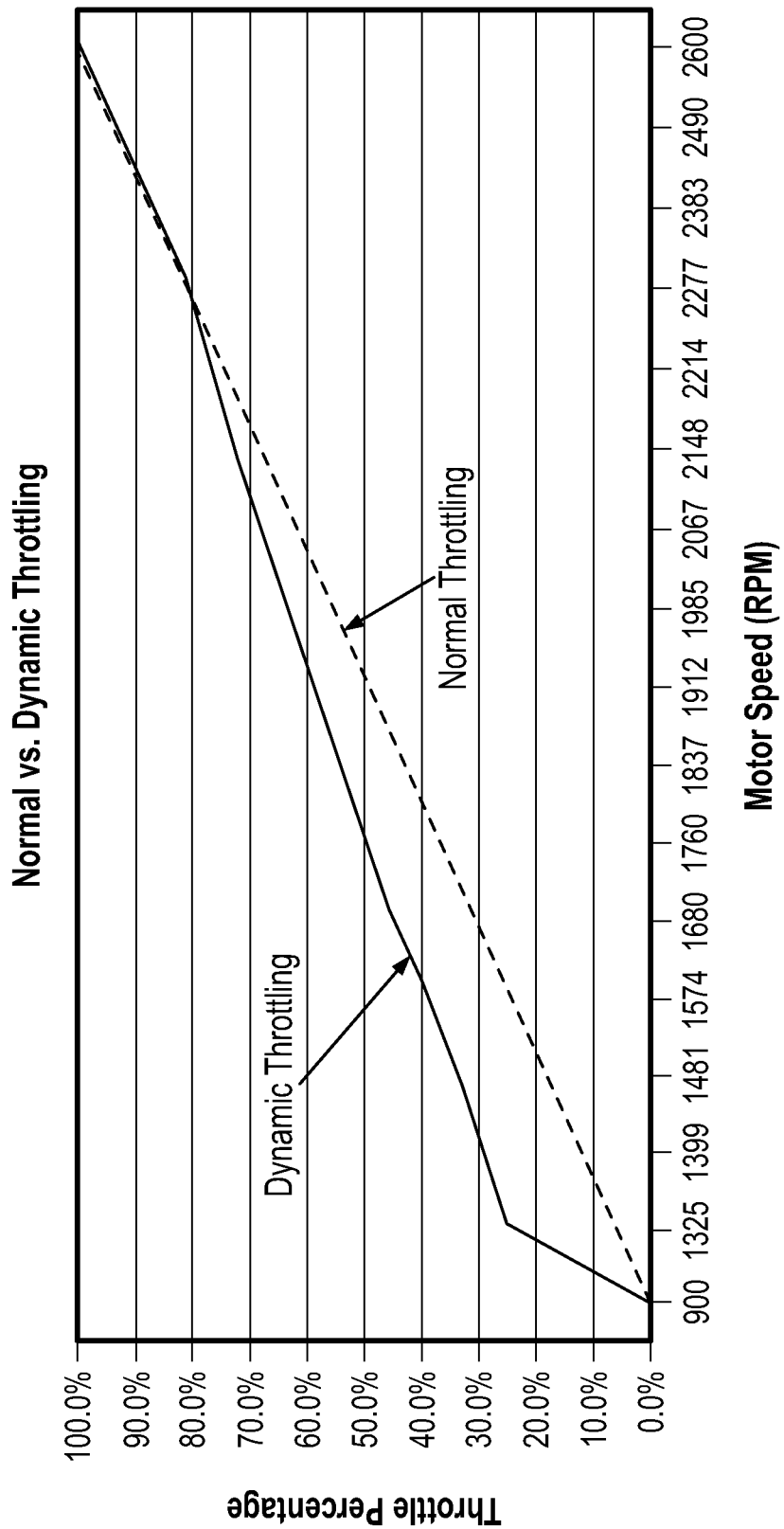
FIG. 2 is a line graph of throttle percentage versus motor speed (RPM) when using dynamic throttling according to exemplary embodiments of the present disclosure and also when using conventional/normal throttling for comparison purposes.

FIG. 2 is a line graph of throttle percentage versus motor speed (RPM) when using dynamic throttling according to exemplary embodiments of the present disclosure. For comparison purposes, FIG. 2 also includes throttle percentage versus motor speed (RPM) when using conventional/normal throttling.

In this example, throttle increments were set to 8 RPM which gives the user a nice throttling resolution throughout the entire RPM band as shown in FIG. 2. But with an 8 RPM throttle increment, the user must press the throttle increase switch (e.g., a throttle increase/up button labeled with a Rabbit icon thereon, etc.) fifty times to get from idle to the start of sweet spot at 1300 RPM. Alternatively, the user could press and hold the throttle up switch down and try to time when the throttle up switch should be released to achieve the sweet spot of 1300 RPM.

Figure 3:
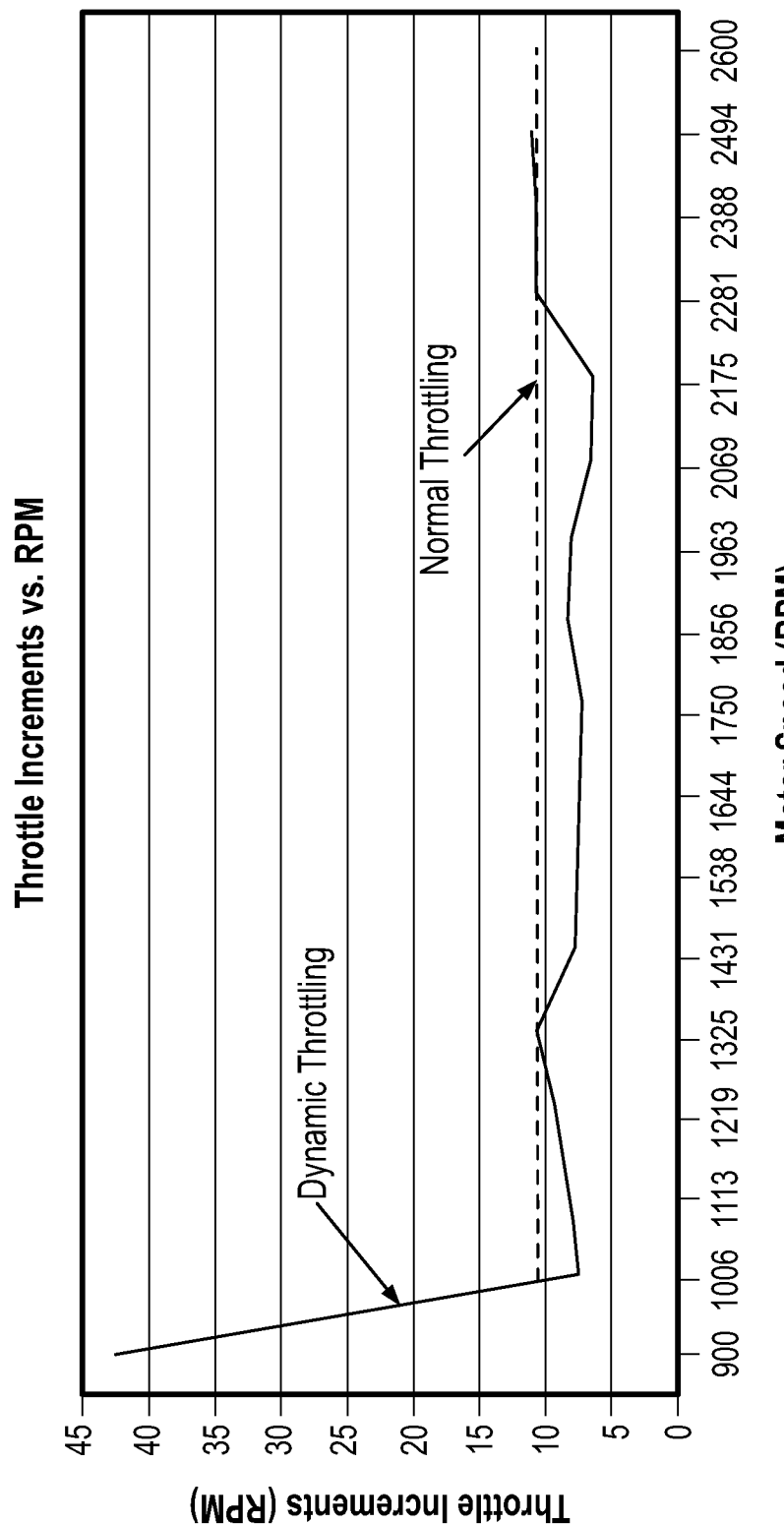
FIG. 3 is a line graph showing varying throttle increments (RPM) versus motor speed (RPM) when using dynamic throttling according to exemplary embodiments of the present disclosure.

FIG. 3 is a line graph showing varying throttle increments (RPM) versus motor speed (RPM) when using dynamic throttling according to exemplary embodiments of the present disclosure. FIG. 3 also shows the conventional/normal throttling having a fixed throttle increment that does not vary based on RPM.

As shown in FIG. 3, the throttle increments vary in RPM size based on the motor speed (RPM). As indicated by the first steep portion of the dynamic throttling line, the initial throttle increments may be relatively large (e.g., first throttle increment of about 35 RPM, etc.) to relatively quickly increase motor speed from idle to the sweet spot. In this example, the user presses the throttle increase switch nine times to get from idle to the start of sweet spot at 1300 RPM. The throttle up switch presses are indicated in FIG. 3 by the changes in slope of the dynamic throttling line. After reaching the sweet spot, the throttle increments decrease to allow high throttling resolution while in the sweet spot.

FIGS. 4A, 4B, 4C, and 4D include example line graphs that may be used when setting up dynamic throttling according to exemplary embodiments of the present disclosure. By way of example, the dynamic throttling can be configured using a graphical user interface in a program configured to allow one to change the configuration of a control panel (broadly, a control or controller) more easily. The program may also allow the configuration to be saved to a USB thumb drive or other portable memory device for importing the configuration into multiple control panels to thereby make the control panels uniform or the same.

Figure 4A:
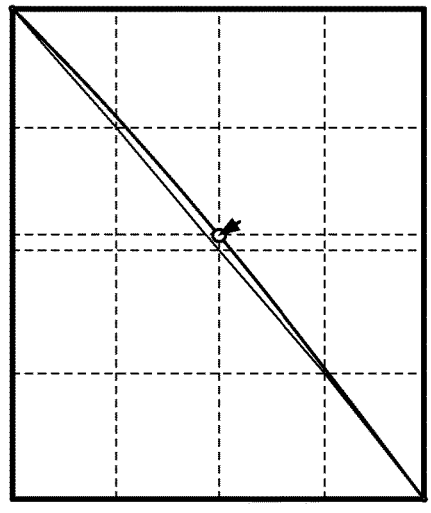
Figure 4C:
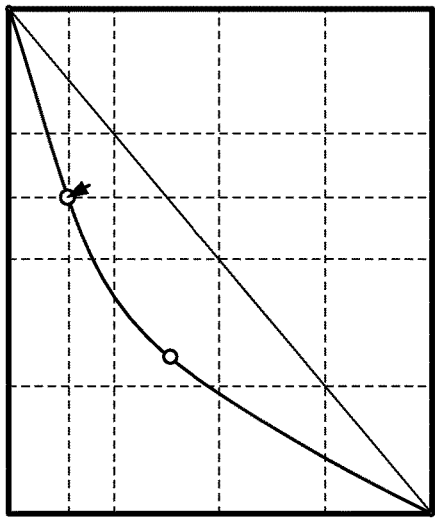

FIG. 4A is a linear graph including a throttling line with Idle and Run RPM for an engine/machine. The linear throttling line (FIG. 4A) can be dragged to alter the throttling line (FIG. 4B). In this example, the linear throttling line shown in FIG. 4A is dragged from a first point (as indicated by the cursor or arrow) such that the throttling line becomes non-linear (e.g., curved, etc.) as shown in FIG. 4B. After the throttling line has been dragged from the first point, the throttling line may be further altered by dragging the throttling line from a second point (as indicated by the cursor or arrow) shown by FIGS. 4C and 4D.

If the throttling line has not yet been altered into a preferred or desired dynamic throttling line, the throttling line may be further altered by dragging the throttling line from one or more other points as desired. The number of alterations to the original throttling line (FIG. 4A) will depend on the original throttling line and the preferred or desired dynamic throttling line. In some exemplary embodiments, only a single alteration is made to the original throttling line (e.g., FIG. 4A to FIG. 4B, etc.) to alter the original throttling line into the preferred or desired dynamic throttling line. In other exemplary embodiments, multiple alterations (e.g., 2, 3, 4, more than 4, etc.) are made to the original throttling line to alter the original throttling line into the preferred or desired dynamic throttling line.

After the throttling line has been altered into the preferred or desired dynamic throttling line, the altered throttling line may then be used to generate a table that includes dynamic throttle increments that vary based on RPM. The table may be generated by the same device (e.g., customizer, etc.) that included the graphical user interface used to alter the throttling line. Or, for example, a different device may be used to generate the table based on the altered throttling line.

The data from the table may thereafter be used for dynamic throttling of the engine/machine. In a manually throttled operation, for example, a controller may use dynamic throttle increments from the table to enable a user to quickly move from idle to the sweet spot of the engine/machine, and thereafter provide a very high throttling resolution (e.g., a highest throttling resolution, etc.) in regard to throttle increments after the engine/machine is within the sweet spot.

By way of example, FIG. 5 includes an example table that may be generated from the throttling line shown in FIG. 4D according to exemplary embodiments of the present disclosure. FIG. 6 is a line graph of the dynamic and normal throttle increments (RPM) versus motor speed (RPM) shown in the table of FIG. 5.

As shown by FIGS. 5 and 6, the normal/conventional throttling increments are fixed at a constant 10 RPM for the entire RPM range from idle motor speed of 900 RPM to a motor speed of 3000 RPM. But the dynamic throttling increments varies depending on the motor speed.

For example, the dynamic throttling increment was initially at 50 RPM for an idle speed of 900 RPM and motor speeds of 1000 RPM, 1100 RPM, and 1200 RPM. At a motor speed of 1300 RPM, the dynamic throttling increment decreased from 50 RPM to 35 RPM. The dynamic throttling increment decreased from 35 RPM to 25 RPM for a motor speed was 1400 RPM. The dynamic throttling increment decreased from 25 RPM to 10 RPM for motor speeds of 1500 RPM and 1600 RPM. The dynamic throttling increment decreased from 10 RPM to 5 RPM for motor speeds of 1700 RPM, 1800 RPM, 1900 RPM, 2000 RPM, and 2100 RPM. The dynamic throttling increment was 10 RPM for motor speeds of 2200 RPM, 2300 RPM, and 2400 RPM. The dynamic throttling increment was 35 RPM for motor speeds of 2500 RPM and 2600 RPM. The dynamic throttling increment was 50 RPM for motor speeds of 2700 RPM, 2800 RPM, 2900 RPM, and 3000 RPM.

The dynamic throttling advantageously enabled quick movement of the engine from an idle speed of 900 RPM to an operating speed of 1500 RPM to 2400 RPM within a sweet spot of the engine. When the engine was within the sweet spot, the dynamic throttling provided a very high throttling resolution of 5 RPM for motor speeds from 1700 RPM to 2100 RPM.

The table and its dynamic throttling/motor speed data therein may be usable by (e.g., downloaded to, automatically or manually input into, etc.) a controller when controlling the throttle of an engine. For example, the dynamic throttling data from a table (e.g., table shown in FIG. 5, other table, etc.) may be manually input into a control panel by a user via a display of a user interface of the control panel, e.g., for a relatively limited number of RPM ranges, etc. This process may also be more automated, e.g., without requiring the user to manually input the dynamic throttling data from a table, such as if the dynamic throttling data from the table is relatively complex in order to provide a more smoother throttling experience and/or to provide an easier graphical method of inputting the information from the table, etc.

In exemplary embodiments, a configurable RPM for an engine is defined at or near the engine's sweet spot that is also referred to as the "Run" RPM. The Run RPM may be configurable by a user accessing a user interface of a control panel (broadly, a controller). By way of example, a user may use the user interface of the control panel to set the Run RPM for the engine at 2000 RPM. The Run RPM may also be a factory default setting (e.g., 2000 RPM, etc.) for the engine, which may be changed or reconfigured by a user as preferred, desired, or deemed necessary.

When the throttle increase/up switch (e.g., a throttle increase/up button labeled with a Rabbit icon thereon, etc.) is pressed and held, the controller ramps the engine RPM up relatively fast, e.g., as fast as possible, etc. For example, the controller may ramp the engine RPM up from an idle speed of 850 RPM relatively quickly via relatively large throttle increments, e.g., 10 RPM, 25 RPM, higher than 25 RPM, etc. When the engine's Run RPM (e.g., 2000 RPM, etc.) is achieved, the throttling is paused automatically without requiring the user to release the throttle up switch. After the throttling has been paused, releasing the throttle up switch will then restore normal throttling during which the engine RPM is increased by the configured throttling increment (e.g., 10 RPM, etc.) for each press and release of the throttle up switch.

With conventional throttling, a user may press and hold a throttle up switch with the intent of stopping at 2000 RPM by releasing the throttle up switch. Thereafter, the user may start dialing in the final speed with incremental throttle adjustments by pressing and releasing the throttle up switch and throttle decrease/down switch (e.g., a throttle decrease/down button labeled with a Turtle icon thereon, etc.) as needed. But as recognized herein, the user may easily blow past the 2000 RPM by releasing the throttle up switch too late when ramping up the engine RPM from idle speed (e.g., 850 RPM, etc.) to 2000 RPM. Or, the user may release the throttle up switch too soon and well before the engine reaches 2000 RPM, such that the user must then try again to reach 2000 RPM for the engine with this conventional throttling.

Advantageously, exemplary embodiments disclosed herein may advantageously eliminate or avoid the need for the user to perfectly time the release of the throttle up switch when conventionally throttling an engine. As disclosed herein, exemplary embodiments are configured such that the engine starts ramping up very quickly (e.g., as fast as possible, etc.) from idle speed to 2000 RPM (or other higher or lower Run RPM) after the user presses and holds the throttle up switch. The throttling is then paused automatically at 2000 RPM without requiring the user to release the throttle up switch and thereby avoiding the user having to perfectly time the release of the throttle up switch. After the throttling has been paused, releasing the throttle up switch will then restore normal throttling during which the engine RPM is increased by the configured throttling increment (e.g., 10 RPM, etc.) for each press and release of the throttle up switch.

Controllers include means for adjusting the speed of the engine, such as first and second switches for respectively increasing or decreasing the engine's RPM when pressed. For example, the first and second switches may respectively comprise a throttle increase/up button (e.g., labeled with a Rabbit icon on the button, etc.) and a throttle decrease/down button (e.g., labeled with a Turtle icon on the button, etc.), which buttons are implemented on a control panel for the engine. In this example, pressing the switches directly changes the engine's RPM. But as recognized herein, but the user may have little regard for the engine RPM but may be more concerned with changing the output of the engine/machine, such as vehicle speed, fluid flow, discharge pressure, etc.

In addition, a controller may be configured with a "Maintain" feature by which the controller automatically adjusts engine RPM speed (e.g., akin to cruise control, etc.) to maintain the configured set up for the machine. In exemplary embodiments disclosed herein, the controller is also configured to allow this Maintain feature to be used when the controller is in manual control mode. In this operational maintain/manual control mode, the controller's throttle increase/up switch and throttle decrease/down switch are usable to adjust a maintain setting for the machine output (e.g., increase or decrease vehicle speed, fluid flow, discharge pressure, etc.) instead of the engine RPM speed.

For example, a pump may be used to deliver a certain water flow rate. In the operational maintain/manual control mode, the controller is configured to allow the user to increase the water flow rate by pressing the controller's throttle increase/up switch (e.g., a throttle increase/up button on the controller labeled with a Rabbit icon, etc.), which will then cause the controller to automatically control the engine's RPM to achieve and maintain the flow rate at the increased level. Conversely, the user may decrease the water flow rate by pressing the controller's throttle decrease/down switch (e.g., a throttle decrease/down button on the controller labeled with a Turtle icon, etc.), which will then cause the controller to automatically control the engine's RPM to achieve and maintain the water flow rate at the decreased level.

In exemplary embodiments, a computer-implemented method for enabling dynamic throttling of an engine includes graphically displaying a graph of a linear throttle line for the engine including an idle speed in revolutions per minute (RPM) and one or more operating speeds in revolutions per minute; using a graphical user interface to alter the linear throttling line into a non-linear dynamic throttling line; and generating a table based on the non-linear dynamic throttling line, the table including dynamic throttle increments that vary based on RPM and that are usable (e.g., by a controller or control panel, etc.) for dynamic throttling of the engine.

In an exemplary embodiment, a control panel for the engine includes a graphical user interface including a display. And, the method includes graphically displaying the graph of the linear throttle line for the engine on the display of the graphical user interface of the control panel; altering the linear throttling line into the non-linear dynamic throttling line by using the graphical user interface of the control panel; and using the control panel to generate the table based on the non-linear dynamic throttling line.

In an exemplary embodiment, the method includes: graphically displaying the graph of the linear throttle line for the engine on a display of a computer; altering the linear throttling line into the non-linear dynamic throttling line by using a graphical user interface of the computer; and using the computer to generate the table based on the non-linear dynamic throttling line.

In an exemplary embodiment, the method includes a controller (e.g., a control panel, etc.) using the dynamic throttle increments from the table for dynamic throttling of the engine to thereby enable quick movement of the engine from the idle speed to an operating speed within a sweet spot of the engine and to thereafter provide a very high throttling resolution for the dynamic throttle increments after the engine is within the sweet spot.

In an exemplary embodiment, the method includes using the graphical user interface to drag the linear throttling line from at least a first point graphically displayed along the linear throttling line. The method may also include using the graphical user interface to drag the altered linear throttling line from at least one or more additional points.

In an exemplary embodiment, the dynamic throttling of the engine enables a user in a manually throttled operation to quickly move the engine from the idle speed to an operating speed within a sweet spot of the engine. The dynamic throttling of the engine provides the user with a very high throttling resolution for the dynamic throttle increments after the engine is within the sweet spot.

In an exemplary embodiment, the method includes saving the dynamic throttle increments from the table to a portable memory device and thereafter downloading the dynamic throttle increments from the portable memory device into multiple controllers, e.g., multiple control panels, etc.

An exemplary embodiment include a control panel for an engine, wherein the control panel is configured to perform a method as disclosed herein. A system may include the control panel and an engine controllable by the control panel. In this example system, the control panel may be operable for using the dynamic throttle increments from the table for dynamic throttling of the engine.

Exemplary embodiments include a control panel for an engine. The control panel comprises a graphical user interface including a display. The display is configured to be operable for graphically displaying a graph on the display of a linear throttle line for the engine including an idle speed in revolutions per minute (RPM) and one or more operating speeds in revolutions per minute The graphical user interface is configured to be useable for altering the linear throttling line into a non-linear dynamic throttling line. The control panel is configured to be operable for generating a table based on the non-linear dynamic throttling line, the table including dynamic throttle increments that vary based on RPM and that are usable by the control panel for dynamic throttling of the engine.

In an exemplary embodiment, the control panel is configured to be operable for using the dynamic throttle increments from the table such that the engine is quickly movable from the idle speed to an operating speed within a sweet spot of the engine, and to thereafter provide a very high throttling resolution for the dynamic throttle increments after the engine is within the sweet spot.

In an exemplary embodiment, the graphical user interface is configured to be usable to drag the linear throttling line from at least a first point graphically displayed along the linear throttling line on the display. The graphical user interface is also configured to be usable to drag the linear throttling line from at least one or more additional points.

In an exemplary embodiment, the control panel is configured to be operable for saving the dynamic throttle increments from the table to a portable memory device, which said dynamic throttle increments are downloadable from the portable memory device into multiple control panels.

In an exemplary embodiment, the control panel is configured to enable a user in a manually throttled operation to quickly move the engine from the idle speed to an operating speed within a sweet spot of the engine, and to thereafter provide a very high throttling resolution for the dynamic throttle increments after the engine is within the sweet spot.

An exemplary embodiment includes a system including a control panel as disclosed herein and an engine controllable by the control panel. The control panel is operable for using the dynamic throttle increments from the table for dynamic throttling of the engine.

Exemplary embodiments include non-transitory computer-readable storage media including executable instructions for enabling dynamic throttling of an engine, which, when executed by at least one processor, cause the at least one processor to: graphically display a graph of a linear throttle line for the engine including an idle speed in revolutions per minute (RPM) and one or more operating speeds in revolutions per minute; alter the linear throttling line into a non-linear dynamic throttling line based on input via a graphical user interface; and generate a table based on the non-linear dynamic throttling line, the table including dynamic throttle increments that vary based on RPM and that are usable (e.g., by a controller or control panel, etc.) for dynamic throttling of the engine.

In an exemplary embodiment, the executable instructions include instructions that when executed by the at least one processor, cause the at least one processor to drag the linear throttling line from at least a first point graphically displayed along the linear throttling line based on input via the graphical user interface. And, the executable instructions include instructions that when executed by the at least one processor, cause the at least one processor to drag the altered linear throttling line from at least one or more additional points based on input via the graphical user interface.

An exemplary embodiment includes a control panel for an engine. The control panel includes a non-transitory computer-readable storage media as disclosed herein. A system may include the control panel and an engine controllable by the control panel. In this example system, the control panel may operable for using the dynamic throttle increments from the table for dynamic throttling of the engine.

In exemplary embodiments, a method of throttling of an engine comprises: rapidly increasing throttling of the engine by a controller from a first operating speed in revolutions per minute (RPM) to a second operating speed within or near a sweet spot of the engine when a user has pressed and held a throttle up switch; pausing throttling of the engine by the controller when the engine has reached the second operating speed within or near the sweet spot of the engine without requiring the user to release the throttle up switch; and after the pause of the throttling, restoring normal throttling of the engine by the controller when the user has released the throttle up switch, whereby the normal throttling includes increasing operating speed of the engine by a throttling increment for each press and release of the throttle up switch.

In an exemplary embodiment, the method includes allowing the user to set or define the second operating speed within or near a sweet spot of the engine by using a user interface of the controller.

In an exemplary embodiment, the method includes rapidly increasing throttling of the engine from the first operating speed to the second operating speed by large throttle increments of at least 10 RPM, 25 RPM, or more than 25 RPM.

In an exemplary embodiment, the method includes increasing operating speed of the engine by 10 RPM for each press and release of the throttle up switch during normal throttling.

In an exemplary embodiment, the first operating speed of the engine is an idle speed of 850 RPM; the second operating speed within or near a sweet spot of the engine is 2000 RPM; and the method includes rapidly increasing throttling of the engine from the idle speed of 850 RPM to 2000 RPM by large throttle increments of at least 10 RPM, 25 RPM, or more than 25 RPM.

In exemplary embodiments, a control panel for an engine comprises a throttle up switch. The control panel is configured to be operable for: rapidly increasing throttling of the engine from a first operating speed in revolutions per minute (RPM) to a second operating speed within or near a sweet spot of the engine when a user has pressed and held a throttle up switch; pausing throttling of the engine when the engine has reached the second operating speed within or near the sweet spot of the engine without requiring the user to release the throttle up switch; and after the pause of the throttling, restoring normal throttling of the engine when the user has released the throttle up switch, whereby the normal throttling includes increasing operating speed of the engine by a throttling increment for each press and release of the throttle up switch.

In an exemplary embodiment, the control panel includes a user interface configured to be operable for allowing the user to set or define the second operating speed within or near a sweet spot of the engine by using the user interface of the controller.

In an exemplary embodiment, the control panel is configured to be operable for rapidly increasing throttling of the engine from the first operating speed to the second operating speed by large throttle increments of at least 10 RPM, 25 RPM, or more than 25 RPM.

In an exemplary embodiment, the control panel is configured to be operable for increasing operating speed of the engine by 10 RPM for each press and release of the throttle up switch during normal throttling.

In an exemplary embodiment, the first operating speed of the engine is an idle speed of 850 RPM; the second operating speed within or near a sweet spot of the engine is 2000 RPM; and the control panel is configured to be operable for rapidly increasing throttling of the engine from the idle speed of 850 RPM to 2000 RPM by large throttle increments of at least 10 RPM, 25 RPM, or more than 25 RPM.

Exemplary embodiments include non-transitory computer-readable storage media including executable instructions for enabling throttling of an engine, which, when executed by at least one processor, cause a controller for the engine to: rapidly increase throttling of the engine from a first operating speed in revolutions per minute (RPM) to a second operating speed within or near a sweet spot of the engine when a user has pressed and held a throttle up switch; pause throttling of the engine when the engine has reached the second operating speed within or near the sweet spot of the engine without requiring the user to release the throttle up switch; and after the pause of the throttling, restore normal throttling when the user has released the throttle up switch, whereby the normal throttling includes increasing operating speed of the engine by a throttling increment for each press and release of the throttle up switch.

In an exemplary embodiment, the executable instructions include instructions that when executed by the at least one processor, cause a user interface of the controller to allow the user to set or define the second operating speed within or near a sweet spot of the engine by using the user interface of the controller.

In an exemplary embodiment, the executable instructions include instructions that when executed by the at least one processor, cause the controller to rapidly increase throttling of the engine from the first operating speed to the second operating speed by large throttle increments of at least 10 RPM, 25 RPM, or more than 25 RPM.

In an exemplary embodiment, the executable instructions include instructions that when executed by the at least one processor, cause the controller to increase operating speed of the engine by 10 RPM for each press and release of the throttle up switch during normal throttling.

Exemplary embodiments include a method relating to controlling an output of a machine including an engine. The method comprises: allowing a user to set and/or adjust a maintain setting for the output of the machine by using at least one of a throttle up switch and a throttle down switch of a controller; and automatically controlling, by the controller, an operating speed of the engine to achieve and/or maintain the output of the machine at the maintain setting.

In an exemplary embodiment, the method includes at least one: increasing the maintain setting for the output of the machine by using the throttle up switch of the controller, and automatically increasing, by the controller, the operating speed of the engine to increase the output of the machine to the increased maintain setting; and/or decreasing the maintain setting for the output of the machine by using the throttle down switch of the controller, and automatically decreasing, by the controller, the operating speed of the engine to decrease the output of the machine to the decreased maintain setting.

Exemplary embodiments include a control panel for an engine of a machine having an output. The control panel comprises a throttle up switch and a throttle down switch. The control panel is configurable into an operational maintain/manual control mode in which the control panel is operable for: allowing a user to set and/or adjust a maintain setting for the output of the machine by using at least one of the throttle up switch and the throttle down switch; and automatically controlling an operating speed of the engine to achieve and/or maintain the output of the machine at the maintain setting.

In an exemplary embodiment, the control panel is configurable into the operational maintain/manual control mode such that the control panel is operable for at least one: increasing the maintain setting for the output of the machine when the user presses the throttle up switch of the controller, and automatically increasing the operating speed of the engine to increase the output of the machine to the increased maintain setting; and/or decreasing the maintain setting for the output of the machine when the user presses the throttle down switch of the controller, and automatically decreasing the operating speed of the engine to decrease the output of the machine to the decreased maintain setting.

Exemplary embodiments include non-transitory computer-readable storage media including executable instructions, which, when executed by at least one processor, cause a controller to be configured into an operational maintain/manual control mode in which the controller is operable to: allow a user to set and/or adjust a maintain setting for an output of a machine by using at least one of a throttle up switch and a throttle down switch of the controller; and automatically control an operating speed of an engine of the machine to achieve and/or maintain the output of the machine at the maintain setting.

In an exemplary embodiment, the executable instructions include instructions that when executed by the at least one processor, cause the controller to be configured into the operational maintain/manual control mode such that the controller is operable to at least one: increase the maintain setting for the output of the machine when the user presses the throttle up switch of the controller, and automatically increase the operating speed of the engine to increase the output of the machine to the increased maintain setting; and/or decrease the maintain setting for the output of the machine when the user presses the throttle down switch of the controller, and automatically decrease the operating speed of the engine to decrease the output of the machine to the decreased maintain setting.

By way of example only, exemplary embodiments may include a control panel having one or more features identical to or similar to a CATTRON CANplus™ CP1000 control panel. For example, an exemplary embodiment may include a control panel that is a manual and autostart platform for electronically governed diesel or natural gas engines. The control panel may also or instead be configured to control mechanically governed diesel engines. The control panel may be configured to display graphical quad-gauge pages on a 4.3" diagonal WQVGA (480×272 pixels) liquid crystal display (LCD). The control panel may be configured to display SAE J1939 parameters reported by an ECU (Engine Control Unit), including, but not limited to the following: RPM, coolant temperature, oil pressure, engine hours, voltage, exhaust emissions system state and diagnostic codes. The backlit display of the control panel may be clearly readable in bright sunlight and total darkness and may be housed in a rugged IP66 rated housing. The control panel may include LEDs (e.g., three LEDs, etc.) to indicate Faults and Warnings, Emission-Related Alerts and Autostart active. The control panel may include display keys (e.g., five display keys, etc) that are associated with a dynamic Display Key bar as well as control buttons (e.g., eight control buttons, etc.). The control panel may feature automatic start/stop control and start/stop modes using an Event Manager, which can start or stop based on any of the digital inputs, analog transducer inputs (e.g., six 4-20 mA analog transducer inputs, etc.), a real time clock, or combinations of date/time and analog or digital inputs. With the use of a transducer, the control panel may have a "cruise control" feature that automatically throttles the engine to maintain a configurable level. The control panel may be configured to use any one of the transducer inputs for the maintain/cruise control feature, regardless of whether that input is also being used as a start or stop event. The description in this paragraph of possible features that may be included with a control panel is provided for purpose of illustration and example only. In alternative exemplary embodiments, the control panel is configured differently, e.g., without one or more the feature(s) described in this paragraph, with different features and/or additional features than the features described in this paragraph, etc.

Aspects of the present disclosure should not be limited to any one particular type of controller, control panel, motor, engine, or machine, as exemplary embodiments disclosed herein may be used with various controllers, control panels, motors, engines, and machines. For example, exemplary embodiments disclosed herein may be configured for providing dynamic throttling for industrial pumps, generators, woodchippers, etc.

As will be appreciated based on the foregoing specification, the above-described embodiments of the disclosure may be implemented using computer programming or engineering techniques including computer software, firmware, hardware, or any combination or subset thereof, wherein the technical effect may be achieved by performing the following operations: graphically displaying a graph of a linear throttle line for the engine including an idle speed in revolutions per minute (RPM) and one or more operating speeds in revolutions per minute; using a graphical user interface to alter the linear throttling line into a non-linear dynamic throttling line; and generating a table based on the non-linear dynamic throttling line, the table including dynamic throttle increments that vary based on RPM and that are usable (e.g., by a controller or control panel, etc.) for dynamic throttling of the engine.

Exemplary embodiments may include one or more processors and memory coupled to (and in communication with) the one or more processors. A processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

It should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, other optical disk storage, magnetic disk storage or other magnetic storage devices, any other type of volatile or nonvolatile physical or tangible computer-readable media, or other medium that can be used to carry or store desired program code in the form of instructions or data structures and that can be accessed by a computer. Combinations of the above should also be included within the scope of computer-readable media.

Computer-executable instructions may be stored in the memory for execution by a processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

It should also be appreciated that one or more aspects of the present disclosure transform a general-purpose computing device into a special-purpose computing device when configured to perform the functions, methods, and/or processes described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for enabling dynamic throttling of an engine, the method comprising:
    graphically displaying a graph of a linear throttle line for the engine including an idle speed in revolutions per minute (RPM) and one or more operating speeds in revolutions per minute;
    using a graphical user interface to alter the linear throttling line into a non-linear dynamic throttling line; and
    generating a table based on the non-linear dynamic throttling line, the table including dynamic throttle increments that vary based on RPM and that are usable for dynamic throttling of the engine.

2. The method of claim 1, wherein a control panel for the engine includes the graphical user interface including a display, and wherein the method includes:
    graphically displaying the graph of the linear throttle line for the engine on the display of the graphical user interface of the control panel;
    altering the linear throttling line into the non-linear dynamic throttling line by using the graphical user interface of the control panel; and
    using the control panel to generate the table based on the non-linear dynamic throttling line that includes the dynamic throttle increments usable by the control panel for dynamic throttling of the engine.

3. The method of claim 1, wherein the method includes:
    graphically displaying the graph of the linear throttle line for the engine on a display of a computer;
    altering the linear throttling line into the non-linear dynamic throttling line by using a graphical user interface of the computer; and
    using the computer to generate the table based on the non-linear dynamic throttling line.

4. The method of claim 1, wherein the method includes a controller using the dynamic throttle increments from the table for dynamic throttling of the engine.

5. The method of claim 4, wherein the method includes the controller using the dynamic throttle increments from the table to thereby enable quick movement of the engine from the idle speed to an operating speed within a sweet spot of the engine and to thereafter provide a very high throttling resolution for the dynamic throttle increments after the engine is within the sweet spot.

6. The method of claim 1, wherein using a graphical user interface to alter the linear throttling line into a non-linear dynamic throttling line includes using the graphical user interface to drag the linear throttling line from at least a first point graphically displayed along the linear throttling line.

7. The method of claim 6, wherein the method includes using the graphical user interface to drag the altered linear throttling line from at least one or more additional points.

8. The method of claim 1, wherein the dynamic throttling of the engine enables a user in a manually throttled operation to quickly move the engine from the idle speed to an operating speed within a sweet spot of the engine.

9. The method of claim 8, wherein the dynamic throttling of the engine provides the user with a very high throttling resolution for the dynamic throttle increments after the engine is within the sweet spot.

10. The method of claim 1, wherein the method includes saving the dynamic throttle increments from the table to a portable memory device and thereafter downloading the dynamic throttle increments from the portable memory device into multiple controllers.

11. A control panel for an engine, the control panel comprising a graphical user interface including a display, wherein:
    the display is configured to be operable for graphically displaying a graph on the display of a linear throttle line for the engine including an idle speed in revolutions per minute (RPM) and one or more operating speeds in revolutions per minute;
    the graphical user interface is configured to be useable for altering the linear throttling line into a non-linear dynamic throttling line; and
    the control panel is configured to be operable for generating a table based on the non-linear dynamic throttling line, the table including dynamic throttle increments that vary based on RPM and that are usable by the control panel for dynamic throttling of the engine.

12. The control panel of claim 11, wherein the control panel is configured to be operable for using the dynamic throttle increments from the table such that the engine is quickly movable from the idle speed to an operating speed within a sweet spot of the engine, and to thereafter provide a very high throttling resolution for the dynamic throttle increments after the engine is within the sweet spot.

13. The control panel of claim 11, wherein the graphical user interface is configured to be usable to drag the linear throttling line from at least a first point graphically displayed along the linear throttling line on the display.

14. The control panel of claim 13, wherein the graphical user interface is configured to be usable to drag the linear throttling line from at least one or more additional points.

15. The control panel of claim 11, wherein the control panel is configured to be operable for saving the dynamic throttle increments from the table to a portable memory device, which said dynamic throttle increments are downloadable from the portable memory device into multiple control panels.

16. The control panel of claim 11, wherein the control panel is configured to enable a user in a manually throttled operation to quickly move the engine from the idle speed to an operating speed within a sweet spot of the engine, and to thereafter provide a very high throttling resolution for the dynamic throttle increments after the engine is within the sweet spot.

17. A method of throttling of an engine, the method comprising:
    rapidly increasing throttling of the engine by a controller from a first operating speed in revolutions per minute (RPM) to a second operating speed within or near a sweet spot of the engine when a user has pressed and held a throttle up switch;

pausing throttling of the engine by the controller when the engine has reached the second operating speed within or near the sweet spot of the engine without requiring the user to release the throttle up switch; and after the pause of the throttling, restoring normal throttling of the engine by the controller when the user has released the throttle up switch, whereby the normal throttling includes increasing operating speed of the engine by a throttling increment for each press and release of the throttle up switch.

18. The method of claim 17, wherein the method includes allowing the user to set or define the second operating speed within or near a sweet spot of the engine by using a user interface of the controller.

19. The method of claim 17, wherein the method includes rapidly increasing throttling of the engine from the first operating speed to the second operating speed by large throttle increments of at least 10 RPM, 25 RPM, or more than 25 RPM.

20. The method of claim 17, wherein the method includes increasing operating speed of the engine by 10 RPM for each press and release of the throttle up switch during normal throttling.

21. The method of claim 17, wherein:

the first operating speed of the engine is an idle speed of 850 RPM;

the second operating speed within or near a sweet spot of the engine is 2000 RPM; and the method includes rapidly increasing throttling of the engine from the idle speed of 850 RPM to 2000 RPM by large throttle increments of at least 10 RPM, 25 RPM, or more than 25 RPM.

* * * * *